Sept. 20, 1932.  E. F. BEGTRUP  1,878,809
RAIL CLAMP
Filed June 7, 1930   3 Sheets-Sheet 2
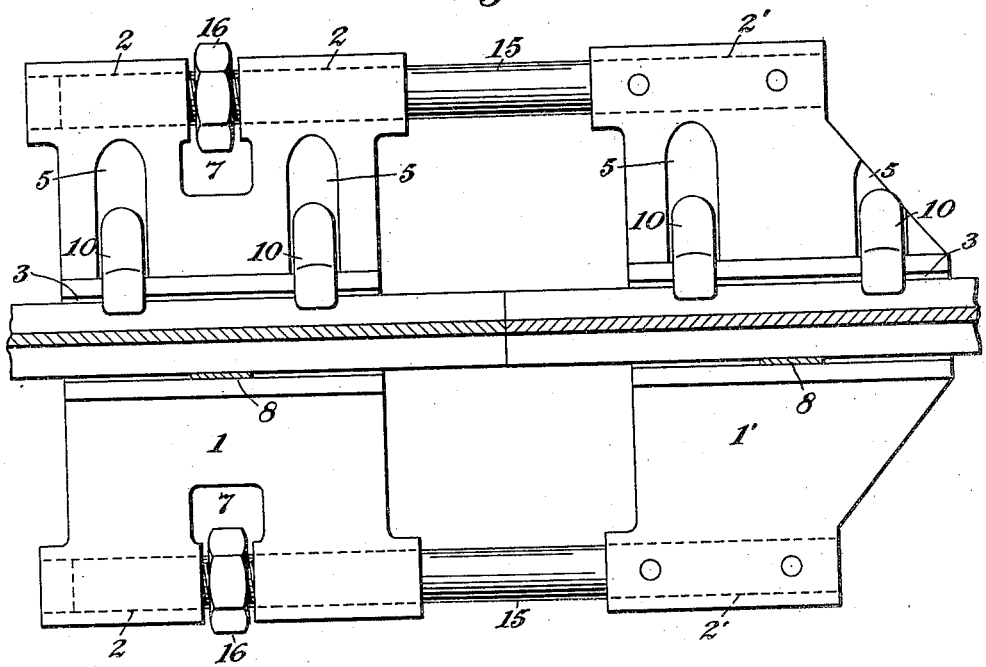
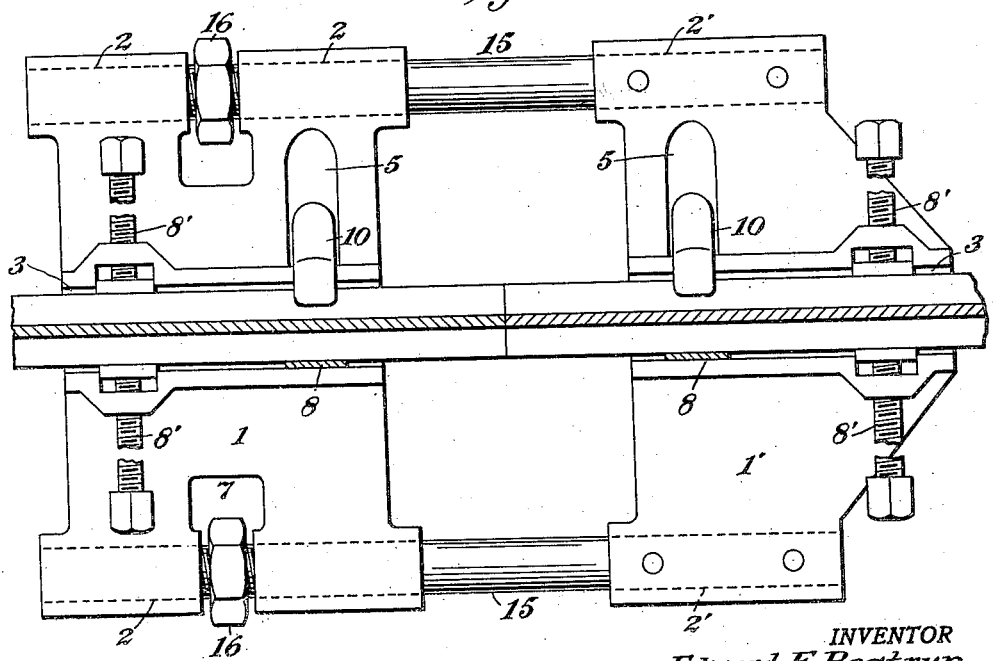
INVENTOR
Edward F. Begtrup
BY
HIS ATTORNEY Sept. 20, 1932.  E. F. BEGTRUP  1,878,809
RAIL CLAMP
Filed June 7, 1930   3 Sheets-Sheet 3
Fig.4
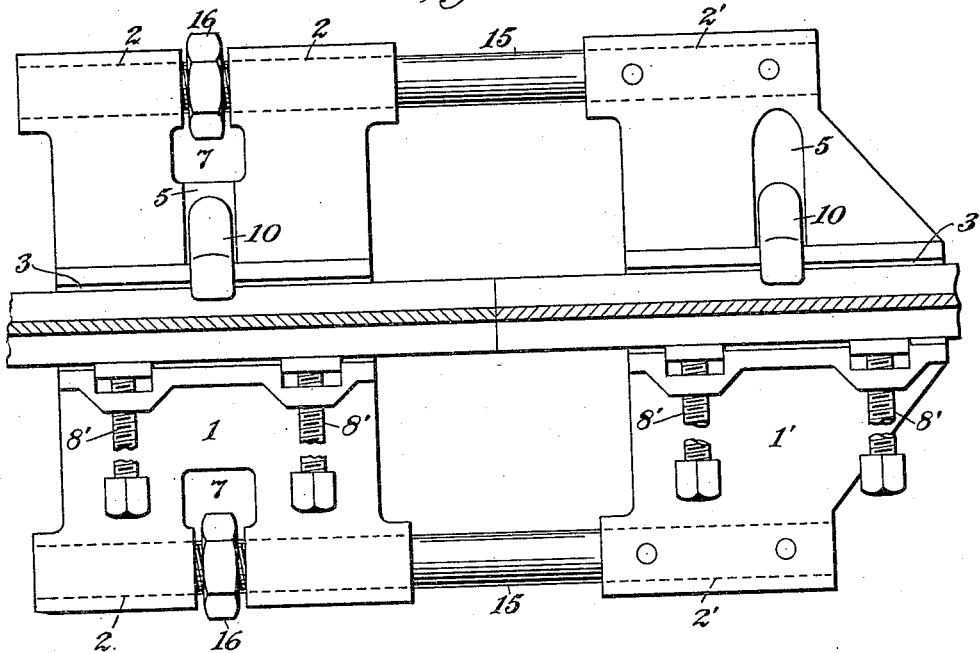
Fig.6
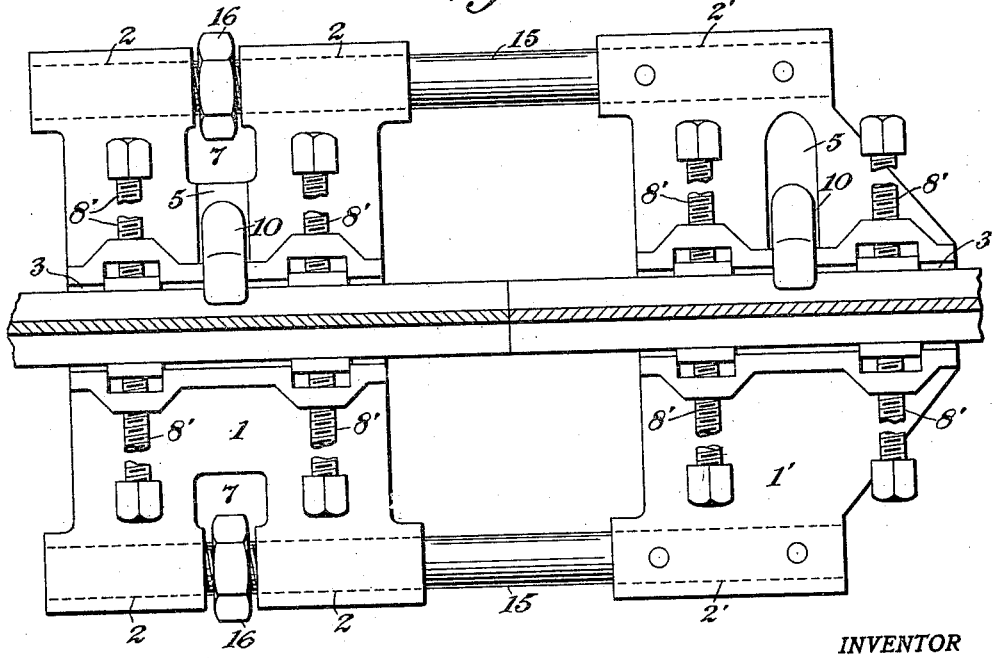
INVENTOR
Edward F. Begtrup
BY 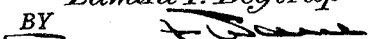
HIS ATTORNEY Patented Sept. 20, 1932

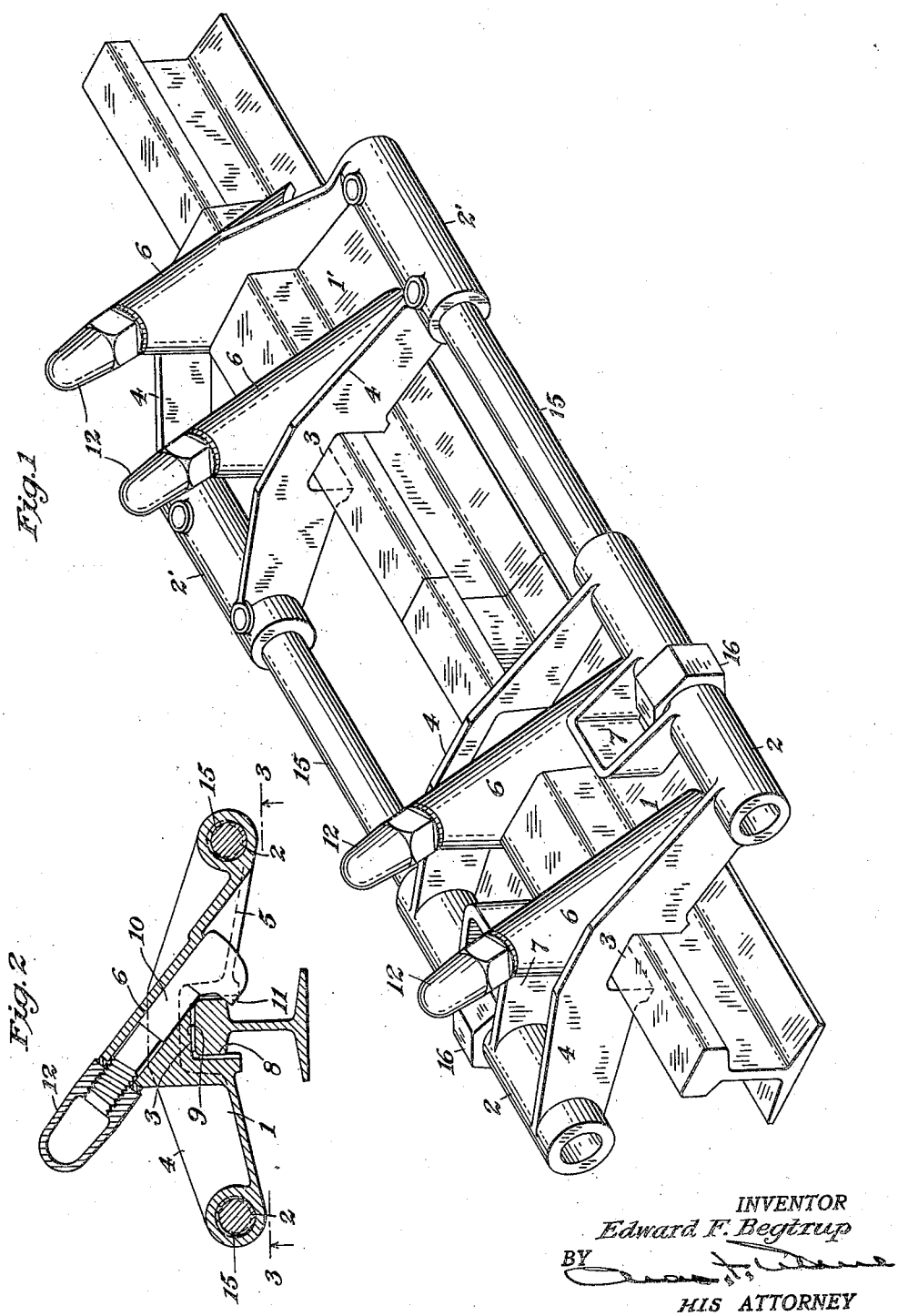

1,878,809

UNITED STATES PATENT OFFICE

EDWARD F. BEGTRUP, OF JERSEY CITY, NEW JERSEY

RAIL CLAMP

Application filed June 7, 1930. Serial No. 459,679.

The invention relates to improvements in rail clamps of the general type as shown and described in the patent to Schultz No. 1,644,358, dated October 4, 1927, and is designed primarily to enlarge the utility of such clamps by providing the same with three or more points of pressure contact with the end of each rail to be welded, whereby rail ends having kinks or deformations may, nevertheless, have their abutting ends brought into such relation that the gauge and tread faces of the heads will be accurately aligned before the butt welding operation is effected.

The invention is illustrated in the accompanying drawings, in which:—

Fig. 1 is a perspective view of the improved clamp applied to the ends of two standard rails.

Fig. 2 is a vertical cross section.

Fig. 3 is a bottom plan view on line 3—3 of Fig. 2.

Figs. 4, 5 and 6 are similar views showing modified arrangements of the clamping or pressure contacts.

The practical pressure welding of rail ends consists, in reality, in the fusion welding of the webs and bases of the rails and the actual pressure welding of the head portions. In order to effect such pressure weld, clamps are applied to the two rail ends, so that, when the rail heads have been highly heated, they may be forced together and the contacting faces will coalesce in a substantially uniform weld. Various forms of clamps suitable for this purpose have been devised and used and, among the most practical, is that illustrated in the Schultz patent aforesaid, in which the rails are brought into alignment, in respect of the tread and gauge faces thereof, by hook bolts acting on the under side of the back of the head of the rail, and forcing the top of the rail and the opposite side or gauge face against the surfaces of the clamp that are parallel with such faces, so as to bring the tread and gauge faces of the rails into alignment. As indicated in said Schultz patent, the function of the hook bolts associated with each clamp member or yoke is to force the rail heads upward and outward against a horizontal and vertical surface of the respective clamp sections or yokes, so as to effect a longitudinal alignment of the tread and gauge faces of the rails at the point of juncture. Clamps of this character have proven entirely satisfactory when the ends of the rails embraced within the clamp were straight and uniform, that is to say, without bends, kinks or deformations. But it has been found in actual practice that most rails are not straight and free from deformations, but are kinked or bent more or less at various points along their lengths, and in forcing the tread and gauge faces of the rail heads against the parallel surfaces of the clamp sections or yoke, rendered it difficult, if not impossible, to bring the rail ends in exact alignment, which is a necessary concomitant of a satisfactory weld.

The present invention provides a clamp of a character which will insure the perfect alignment of the rail ends by providing three or more points of pressure contact between the clamping members of each yoke, one or more of which contact elements may be adjusted relative to the others, so that a rail end that is bent or deformed may be rocked or moved either horizontally or vertically until the ends of both rails are brought into the desired alignment.

A relatively simple form of the invention is illustrated in Figs. 1, 2 and 3, in which 1 indicates the body portion of a yoke member provided at each end with a pair of spaced sockets 2, 2 to receive the customary tension bolts 15, which are engaged by nuts 16, which occupy recessed portions 7 of the yoke casting. Formed longitudinally in the mid section of the yoke 1 is a recess 3, which straddles the rail head and is of somewhat greater width than the rail head, said recess being defined by a vertical wall parallel with the gauge face of the rail head and a top or horizontal wall parallel with the running surface or tread of the rail, the other wall of the recess normally being spaced at some distance from the opposite side of the rail head. The body of the yoke is reinforced by vertical transverse webs 4, 4 extending between the sockets 2, 2. Formed integrally with the body of the yoke are two hollow bosses or sockets 6, 6 having generally cylindrical bores opening into an enlarged recess or housing 5 formed in the under side of the yoke, the axes of the cylindrical bores being at an oblique angle to the horizontal axis of the yoke, so that each bore intersects the recess 3 in the yoke. Each of the inclined bores in the socket members 6 is engaged by a bolt 10, provided on its outer end with screw threads engaged by a cap nut 12 and having formed on its lower end a hook 11, which occupies housing 5 within the yoke and is so disposed as to engage the lower edge or side of the rail head opposite the gauge face when the nuts 12 carried by the screw threaded ends of the bolts are set up, the said nuts engaging the ends of the socket member 6.

The clamp, as a whole, comprises two yokes, which are generally similar, except that the companion yoke 1' is provided with a single socket 2' on each end, which sockets receive the ends of the tension bolts 15, which latter are locked to the sockets by set screws, rivets or the like. Interposed between the gauge face of each rail end and the parallel vertical face of recess 3 in the corresponding clamp member is a shim or liner 8, which is preferably located substantially midway between the hook bolts and the sockets in which the latter are mounted, so that the liner presents a pressure contact abutment of limited area on one side of the rail head and the hook ends 11 of the bolts 10 constitute pressure applying elements, so that each member or yoke of the clamp is engaged with its corresponding rail end by a three point contact. It will, therefore, be seen that, if the end of the rail within the clamp is bent or deformed or is of such character that it could not be brought into alignment with the rail in the other member of the clamp, the desired alignment may be effected by varying and adjusting the pressure imposed upon the outside of the rail head by the hook bolts, so that the end of the rail may be rocked on or actually bent about the abutment 8 until the rail ends are brought into alignment. It will be understood, of course, that the alignment of the top surfaces or treads of the rails will be effected by the normal operation of the hook bolts.

If desired, a similar shim or liner, such as 9, may be located between the mid section of the top wall of the recess 3 and the tread surface of the rail, which will serve as an abutment against which the hook ends of the bolts may work in bringing the tread surfaces of the rails into alignment. If the ends of the rails have mere lateral or upward bends or deflections therein, it is possible to employ the clamp without the shims or liners, as the straightening of the bent section of the rail may be effected directly by differential pressures applied by the hook bolts, provided the bent section of the rail falls within the limits of the clamp. In any event, when the respective ends of the rails are engaged with the corresponding yokes and pairs of hook bolts, the latter may be manipulated to apply differential pressures to the rail ends until the latter are brought into axial alignment with their tread and gauge faces in the same planes. In this particular form of the device, the two hook bolts in each yoke section constitute the two adjustable members of the three point contact between the clamp and the rail end, the vertical wall of the recess 3 of each yoke engaging the gauge face of the rail end constituting the third contact point of area and which is, in effect, an abutment, the shim or liner, when the same is used, serving as a means for limiting the area of this third point of pressure contact.

It is obvious that this shim or abutment, if placed on the vertical wall of the recess 3 of each yoke, would take care of horizontal adjustments of the rail and a similar shim or abutment on the horizontal wall of the recess 3 would take care of vertical adjustments and as these adjustments are made by means of hook bolts disposed diagonally it is desirable to facilitate various portions of vertical and horizontal adjustments to have these shims or abutments more or less movable so that the relative horizontal or vertical adjustment may more easily be determined.

In Fig. 4, the clamp, as a whole, is of the same general form as that shown in the preceding figures, so that it will not be necessary to describe the details of construction thereof other than to say that each yoke is provided with a single socket 6 and, therefore, a single hook bolt 10, which is adapted to engage the outside of the rail head as in the preceding case. Each of the yokes 1 and 1' is provided with a pair of spaced adjusting screws 8', 8' mounted in recessed lugs on the under side of the clamp with their outer ends adapted to be moved into abutting relation with the gauge face of the corresponding rail end; the screws being disposed laterally with respect to the hook bolt, that is to say, on each side of the longitudinal axis of the hook bolt so that the latter and the two adjusting screws constitute a three point pressure contact between the yoke and the rail end engaged therewith, and by setting up the hook bolt and differentially adjusting the set screws in the respective yokes, the ends of the rails can be brought into exact alignment.

In the modification shown in Fig. 5, the three point pressure contact between each yoke and the corresponding rail end is effected by a single hook bolt 10, arranged as before, and two adjusting screws of the same general type as those shown in the preceding figure, but which are disposed on opposite sides of the recess 3 of the yoke, that is to say, one on the same side as the hook bolt and the other on the opposite side. It will be obvious that by differentially adjusting the set screws, the end of the rail within the clamp may be adjusted to any position and, therefore, to a position in which it is in alignment with the rail in the other yoke member of the clamp.

In the modification shown in Fig. 6, each yoke is provided with a single hook bolt 10 of the same structure and arrangement as previously described and four adjusting screws 8′ arranged in pairs on opposite sides of the recess 3 of the yoke, so that by differentially adjusting the respective screws, the end of the rail within the yoke may be adjusted to any desired position.

It will be seen, therefore, that, in each of the modifications, the essential novelty resides in the three point contact between each member of the clamp and the head of the rail end engaged therewith, so that a variation in either the pressure or the position of any two of the three points of contact will render it possible to move, adjust or even straighten the rail end until it is in alignment with its fellow carried by the opposite yoke of the clamp. It will be obvious, of course, that this three point contact is not necessarily limited to the rail heads, as similar contacts with other parts of the rail sections or ends will have the same results and advantages, but it is preferred that the clamping be accomplished through the rail heads for the reason that, if these are brought into alignment, the other portions will also be properly alined.

What I claim is:

1. In a clamp for use in pressure welding rails of the type involving two yokes with bolts connecting the yokes and hook bolts carried by the yokes and engaging the respective rail heads to bring the gauge and tread surfaces into alignment, said clamp involving a three point contact with each rail end, with means for varying the pressure applied at two of said contact points.

2. In a clamp for use in pressure welding rails of the type involving two yokes with bolts connecting the yokes and hook bolts carried by the yokes and engaging the respective rail heads to bring the gauge and tread surfaces into alignment, said clamp involving a three point contact between each rail end and the corresponding yoke and hook means, and means for adjusting the pressure at two of said contact points.

3. A clamp for use in pressure welding rails, comprising two yokes each having end sockets, bolts engaging said sockets for connecting the yokes laterally of the rail engaging portions thereof, each yoke provided with a rail straddling recess having a vertical wall adjacent the gauge side of a rail head and a horizontal wall adjacent the rail tread, means carried by each yoke to effect a three point contact with the corresponding rail end, and means for varying the pressure at two of said contact points.

4. A clamp for use in pressure welding rails, comprising two yokes each having end sockets, bolts engaging said sockets for connecting the yokes laterally of the rail engaging portions thereof, each yoke provided with a rail straddling recess having a vertical wall adjacent the gauge side of a rail head and a horizontal wall adjacent the rail tread, abutment means on the vertical wall to effect a contact of limited area with the gauge face of the corresponding rail, and means carried by each yoke to exert upward and laterally directed pressure on the opposite side of the rail head and at points disposed laterally with reference to the abutment means.

5. A clamp for use in pressure welding rails, comprising two yokes, bolts connecting the yokes, each yoke provided with a rail straddling recess having one vertical wall adjacent the gauge face of the rail head and a horizontal wall adjacent the rail tread, abutment means on the vertical wall to effect a contact of limited area with the gauge face of the corresponding rail, a pair of oblique hollow bosses on each yoke and disposed on each side of the abutment, the bores of which bosses intersect the recesses, and longitudinally adjustable bolts in each of the bosses having hooked lower ends to engage the lower edge of the other side of the rail head.

In testimony whereof I affix my signature.

EDWARD F. BEGTRUP.